United States Patent Office 3,223,688

Patented Dec. 14, 1965

1

2

3,223,688

VINYL POLYMERIZATION PROCESS USING A CO-CATALYST OF CHROMYL COMPOUND WITH ORGANOMETALLIC COMPOUND

Elmer J. Badin, Cranford, N.J., assignor to Celanese Corporation of America, New York, N.Y., a corporation of Delaware No Drawing. Filed Mar. 12, 1959, Ser. No. 798,842

20 Claims. (Cl. 260—88.7)

This invention relates to new polymerization catalyst systems and their use in a process for the polymerization of ethylenically unsaturated compounds.

Various types of catalysts are in use or have been proposed for the polymerization of ethylenically unsaturated compounds. These are generally classified as free radical, anionic or cationic depending on the type of chemical entity which is considered to initiate the polymerization. The most commonly used catalyst for the polymerization of most monomers have been the free radical catalysts exemplified by the peroxides such as benzoyl peroxide. However, in recent years various new catalyst systems have been discovered for the polymerization of olefins, typical of which are titanium tetrachloride or trichloride with an organometallic compound. It was found that in many cases the polymers obtained e.g. polyethylene, were superior in certain respects to the polymers obtained with conventional free radical catalysts. While the new catalysts are often very effective in the polymerization of olefins, they may be considerably less effective in the polymerization of monomers having a relatively large dipole moment e.g. acrylonitrile, vinyl chloride and methyl methacrylate.

It is an object of this invention to provide a new type of polymerization catalyst system which is effective in the polymerization of a wide range of ethylenically unsaturated monomers. It is a further object of this invention to provide a process of polymerizing ethylenically unsaturated compounds using said new catalyst system whereby improved polymers may be obtained. Further objects will become apparent from the following detailed description of the invention.

In accordance with this invention at least one ethylenically unsaturated monomer is polymerized by contacting it with a novel catalyst system comprising a chromyl compound and an organometallic compound wherein carbon is bonded directly to a metal which is a member of Group IIIb of the Periodic Table (Mendeleev). The chromyl radical is $CrO_2{++}$ wherein chromium is hexavalent. It has been found that unlike other multicomponent catalyst systems comprising a transition metal compound and an organometallic compound, the catalyst systems of this invention are effective not only in the polymerization of olefins such as ethylene but also in the polymerization of compounds having relatively high dipole moments e.g. acrylonitrile, vinyl chloride and methyl methacrylate.

Some chromyl compounds which may be used are chromyl chloride ($CrO_2Cl_2$) and chromyl acetate ($CrO_2(C_2H_3O_2)_2$). Organoaluminum compounds are preferred as the organometallic compound e.g. aluminum trialkyls, aluminum triaryls, and aluminum alkyl sesquihalides.

Particularly suitable for some purposes as the catalytic chromyl compound of this invention are certain novel addition complexes of a chromyl compound, e.g. chromyl chloride, and a hydrocarbon, e.g. an olefin especially an alpha-olefin such as hexene-1. These complex compounds are prepared, for example by adding a solution of the chromyl compound slowly to a solution of the hydrocarbon while carefully controlling the temperature. The addition complex is precipitated e.g. by cooling and the solid compound treated in any suitable manner e.g. washed and dried, before using it as a cocatalyst.

In one convenient embodiment the chromyl compound and organometallic compound are brought together to form the catalyst system of this invention. The monomer is then contacted with the catalyst mass either in the presence of an organic solvent or dispersion medium or without any solvent. After the reaction has proceeded to the desired point it is interrupted and the polymer precipitated e.g. by adding to the mass a nonsolvent for the polymers such as methanol. The polymer is then separated and washed. The process may be carried out batchwise wherein the monomer is added to the catalyst mass in an autoclave until the desired amount of polymer is produced after which the reaction is interrupted and the polymer precipitated, or the process may be carried out continuously e.g. by sending streams of catalyst, solvent and monomer into the bottom of the reactor and continuously withdrawing a mass comprising polymer, catalyst, unreacted monomer and solvent from the top of the reactor.

The optimum reaction conditions will depend to some extent on the type of monomer and proportions of reactants and catalyst. One suitable range of catalyst concentration is 2.5 to 100 mmols (gram-millimoles), preferably 5 to 25 mmols of chromyl compound per liter of reaction zone with a suitable range of mol ratios of chromyl compound to organometallic compound in the catalyst being from 0.10:1 to 2.0:1. Depending on the monomer being polymerized and the conditions of polymerization as much as 133 grams or more of polymer can be produced per gram of chromyl compound. Suitably the temperature of polymerization is in the range of 10 to 100° C.; preferably 20 to 80° C. and the pressure is in the range of 0 to 1000 p.s.i.g., preferably 0 to 400 p.s.i.g.

The following examples further illustrate the invention.

EXAMPLE I

This example illustrates the polymerization of ethylene with a chromyl chloride-aluminum triethyl catalyst.

To 400 ml. of cyclohexane in a stainless steel reaction tube were added 20 mmols of aluminum triethyl and 5 mmols of chromyl chloride. The reaction tube was sealed and pressured to 350 p.s.i.g. with ethylene and allowed to react for 180 minutes. During this time the temperature rose from 30 to 79° C. due to exothermic reaction. At the end of the reaction period methanol containing 3% concentrated hydrochloric acid was added and the resulting precipitated polymer was filtered. The methanol is acidified with hydrochloric acid to dissolve out any oxy-titanium or oxy-aluminum compounds formed by methanol-water addition. The solid polymer was washed with methanol in a Waring Blendor, filtered and washed again with methanol. The polymer was dried and the yield of dried polymer was found to be 41.4 grams with a melting range of 125–129° C. Viscosity measurements in tetrahydronaphthalene solution at 130° C. indicated the viscosity molecular weight to be 240,000.

While Example I illustrates polymerization at 350 p.s.i.g. initial pressure, the polymerization may also be carried out at atmospheric pressure by passing ethylene gas at controlled rate through the catalyst-solvent slurry.

Example II to V illustrate the preparation of a chromyl chloride-hexene-1 addition complex and its use with aluminum triethyl as a catalyst for the polymerization of ethylene.

EXAMPLE II

To 500 ml. of carbon tetrachloride in a flask equipped with stirrer were added 25 ml. of hexene-1. A one molar solution of chromyl chloride in carbon tetrachloride in an amount of 100 ml. were added dropwise with stirring while maintaining the temperature at 20–30° C. The material was cooled in a refrigerator, filtered, washed with carbon tetrachloride and dried in a vacuum desiccator for 18 hours. There was obtained 10.2 grams of brownish powder which had no melting point up to 240° C. Infrared examination of the material showed the double bond of hexene-1 to have disappeared on complexing. The compound which was paramagnetic, liberated little or no iodine from an acidified solution of potassium iodide. Analysis of the compound indicated that it was composed of about two hexene-1 molecules per three chromyl chloride molecules.

The polymerization steps of Example I were then repeated except that 1.32 grams of the chromyl chloride-hexene-1 addition complex prepared as described above were used instead of chromyl chloride. The temperature rose from 30 to 45° C. due to exothermic reaction. The yield of polymer was 44.6 grams of melting range 126–130° C. The molecular weight of the polymer by viscosity measurement in tetrahydronaphthalene at 130° C. was found to be 1,120,000.

As shown by this example, the chromyl chloride-hexene-1 addition complex is particularly suitable for the polymerization of ethylene to obtain a polymer of high molecular weight.

EXAMPLE III

The polymerization steps of Example I were repeated except that the catalyst system was composed of 0.717 gram of chromyl chloride-hexene-1 addition complex, the preparation of which is shown in Example II, and 20 mmols of aluminum triethyl. The polyethylene formed had a melting range of 124–128° C.

EXAMPLE IV

The polymerization steps of Example II were repeated except that the catalyst was composed of 3.59 grams of the chromyl chloride-hexene-1 complex and 20 mmols of aluminum triethyl. Polyethylene was formed in a yield of 38.6 grams and with a melting point range of 127–130° C.

EXAMPLE V

This example illustrates the polymerization of ethylene with chromyl chloride-hexene-1 complex and aluminum triethyl at atmospheric pressure.

To 1.32 grams of chromyl chloride-hexene-1 addition complex prepared as described in Example II and dispersed in 400 ml. of dry distilled cyclohexane were added 20 mmols of aluminum triethyl which resulted in the formation of a dark brown dispersion. Ethylene was passed into the mixture at a rate of 1900 ml./minute. The reaction was slightly exothermic resulting in a temperature rise of 33 to 45° C. in 60 minutes at the end of which time methanol containing 3% concentrated hydrochloric acid was added to interrupt the reaction and precipitate the polymer. The solid polymer was filtered and washed with methanol and water. Then it was washed with methanol in a Waring Blendor, filtered, washed again with methanol and dried. There resulted 11.5 grams of solid polymer of melting range 135–139° C. The molecular weight of the polymer indicated by the viscosity of a solution of the polymer in tetrahydronaphthalene at 130° C. was 283,000.

EXAMPLE VI

This example illustrates the use of chromyl acetate with aluminum triethyl as a polymerization catalyst for ethylene.

Chromyl chloride in an amount of 0.05 mole in carbon tetrachloride solution was added dropwise over a period of 40 minutes to 16.70 grams (0.10 mole) of silver acetate dispersed in 500 ml. of carbon tetrachloride. A finely divided brown precipitate was formed. The mixture was cooled and filtered, and the precipitate washed in carbon tetrachloride and dried for 18 hours in a vacuum desiccator resulting in 16.4 grams of a finely divided brown powder. This powder contained chromyl acetate and silver chloride and was used as such in the polymerization reaction.

To 400 ml. of dried distilled cyclohexane in a stainless steel stirred reaction tube were added 20 mmols of aluminum triethyl and 3.28 grams of the chromyl acetate-silver chloride mixture prepared as described above. The reaction tube was sealed, pressured to 350 p.s.i.g. with ethylene and allowed to react for 180 minutes. During this time the temperature rose from 30 to 44° C. due to exothermic reaction. At the end of this period the reaction was interrupted and the polymer precipitated by the addition of methanol containing 3% of concentrated hydrochloric acid. The solid polymer was filtered, washed in a Waring Blendor with dilute ammonium hydroxide, washed again with dilute nitric acid and again with methanol. Drying of the purified polyethylene yielded 28.3 grams of polymer having a melting point range of 132–136° C. Viscosity measurement in tetrahydronaphthalene solution at 130° C. led to results fixing the viscosity molecular weight at greater than 490,000.

The polyethylene produced in Examples I to VI could be used in the manufacture of pipe, household articles, toys, housings of various types and many other products.

EXAMPLES VII TO XIV

These examples illustrate the polymerization of vinyl chloride with a chromyl chloride-aluminum triisobutyl catalyst.

The examples were carried out in a stainless steel stirred reaction cylinder. Dry distilled cyclohexane in an amount of 400 ml. and the components of the catalyst which differed in amount in each example were added to the cylinder in a nitrogen atmosphere. The cylinder was sealed and cooled. A quantity of liquid vinyl chloride in an amount of 1.9 mols which was cooled by a mixture of ice and methanol was collected in a separate steel tube. The liquid monomer was then added to the reaction cylinder and polymerization started at an initial temperature of 30° C. except in Example XV where it was started at 70° C. After reaction for 180 minutes the reaction mass was added to methanol acidified with 3% hydrochloric acid to precipitate the polymer which was filtered. The solid polymer was washed in methanol in a Waring Blendor, filtered, rewashed with methanol and dried at 60° C. Inherent viscosities of the polymers were obtained at c.=0.1 in tetrahydronaphthalene at 130° C. The results are shown in Table 1.

*Table 1*

| Example | Chromyl chloride (mmols) | Aluminum triisobutyl (mmols) | Solid product | |
|---|---|---|---|---|
| | | | Melting range (° C.) | Inherent viscosity |
| VII | 4 | 12 | 80–115 | 0.20 |
| VIII | 6.7 | 20 | 75–125 | 0.13 |
| IX | 6.7 | 20 | 85–110 | 0.39 |
| X | 2 | 6 | 85–120 | ---------- |
| XI | 8 | 20 | 85–115 | 0.20 |
| XII | 10 | 20 | 80–115 | 0.18 |
| XIII | 14 | 20 | 80–120 | ---------- |
| XIV | 6.7 | 20 | 98–130 | ---------- |

EXAMPLES XV TO XXI

These examples illustrate the polymerization of acrylonitrile with different chromyl compounds and aluminum triisobutyl.

In each case liquid monomer was added to 400 ml. of dry distilled cyclohexane in a stainless steel reactor. The chromyl compound in an amount of 6.7 mmols was added followed by 20 mmols aluminum triisobutyl as a 1.17 molar solution in cyclohexane. The chromyl compound was chromyl chloride in Examples XV to XIX, chromyl chloride-hexene-1 addition complex in Example XX (prepared as described in Example II), and a chromyl acetate-silver chloride mixture in Example XXI (prepared as described in Example VI). In all the examples except Example XVI the reactor was sealed under nitrogen at atmospheric pressure; in Example XVI the reactor was sealed at 250 p.s.i.g. nitrogen pressure. After sealing, the reaction tube was stirred at the desired temperature for 180 minutes. At the end of this period the entire contents of the reaction tube were added to methanol acidified with hydrochloric acid. The polymer was filtered, washed in a Waring Blendor with methanol, refiltered and rewashed with methanol. The polymer was then dried at 60° C. in a vacuum oven. Inherent viscosities of the polymers were obtained from viscosities measured at c.=0.1 in dimethyl formamide at 25° C. The results are shown in Table 2:

*Table 2*

| Example | Quantity of acrylonitrile (moles) | Reaction temperature (° C.) | Polymer | |
|---|---|---|---|---|
| | | | Melting range (° C.) | Inherent viscosity |
| XV | 1.89 | 30 | 155–160 | 0.71 |
| XVI | 1.89 | 30 | 170–180 | 0.29 |
| XVII | 1.89 | 80 | 170–178 | 0.61 |
| XVIII | 2.84 | 30 | 175–190 | 1.37 |
| XIX | 3.78 | 30 | 180–190 | 1.19 |
| XX | 1.89 | 80 | 185–200 | 0.75 |
| XXI | 1.89 | 80 | 220–230 | ------------ |

The acrylonitrile polymers produced in Examples XV to XXI were suitable for spinning into fibers for textile manufacture.

EXAMPLES XXII TO XXVI

These examples illustrate the polymerization of methyl methacrylate with chromyl chloride and aluminum triisobutyl.

Solvent consisting of 400 ml. of dry distilled cyclohexane was added to a stainless stirred reaction cylinder in a nitrogen atmosphere. Liquid monomer in an amount of 1.89 moles was then introduced followed by chromyl chloride in an amount of 6.7 mmols as a one molar solution in carbon tetrachloride and 20 mmols of aluminum triisobutyl as a 1.17 molar solution in cyclohexane. The reaction cylinder was sealed under nitrogen and stirred at the desired temperature for 180 minutes. At the end of this period the entire contents of the reaction cylinder were added to methanol acidified with hydrochloric acid to precipitate the polymer. The polymer was filtered, washed in a Waring Blendor with methanol, refiltered and rewashed with methanol. The polymethyl methacrylate was then dried in a vacuum oven at 60° C. Inherent viscosities of the polymers were obtained at c.=0.1 in tetrahydronaphthalene at 130° C. The results are shown in Table 3:

*Table 3*

| Example | Reaction temperature (° C.) | Polymer | |
|---|---|---|---|
| | | Melting range (° C.) | Inherent viscosity |
| XXII | 30–52 | 175–185 | 0.47 |
| XXIII | 30–44 | 165–175 | ------------ |
| XXIV | 60 | 155–162 | ------------ |
| XXV | 80 | 165–175 | 0.42 |
| XXVI | 80 | 158–167 | ------------ |

For purposes of comparison methyl methacrylate was polymerized with 0.1 weight percent benzoyl peroxide in a sealed tube for 22 hours at 60° C. This led to quantitative conversion to a solid transparent polymer of melting range 150 to 180° C. Certain properties of this polymer and the polymer produced in Example XXII are compared in Table 4. The Rockwell Hardness and Heat Distortion Temperature were determined using 0.125 inch thick fused samples and the pycnometer solvent for the density measurements was n-butanol.

*Table 4*

| Polymethyl methacrylate | Density at 25° C. | Rockwell Hardness | Heat Distortion Temperature (° C.) at 264 p.s.i. |
|---|---|---|---|
| As in Ex. XXII | 1.177 | M98 | 109 |
| With 0.1% benzoyl peroxide | 1.181 | M78 | 78 |

It is obvious from the results shown in Table 4 that the use of a catalyst in accordance with this invention leads to the production of polymethyl methacrylate having improved hardness and heat distortion properties.

The polymers of methyl methacrylate produced in accordance with Examples XXII to XXVI are useful in the production of artificial glass and transparent molded articles.

It is to be understood that the foregoing detailed description is merely given by way of illustration and that many variations may be made therein without departing from the spirit of my invention.

Having described my invention what I desire to secure by Letters Patent is:

1. A process of polymerizing at least one monomer selected from the group consisting of vinyl chloride, acrylonitrile, methyl methacrylate and ethylene which comprises contacting said monomer with a polymerization catalyst system consisting essentially of (1) a chromyl compound selected from the group consisting of a preformed complex of chromyl chloride and an alpha olefin having up to about 6 carbon atoms, and chromyl acetate and (2) an organometallic compound having up to about 18 carbon atoms, wherein a metal of Group III*b* of the Periodic Table (Mendeleev) is directly bonded to at least one member selected from the class consisting of alkyl, aryl, and alkyl sesquihalide groups.

2. A process of polymerizing a monomer selected from the group consisting of vinyl chloride, acrylonitrile, methyl methacrylate, and ethylene which comprises contacting said monomer at a temperature between about 10 and 100° C. and a pressure between about 0 and 1000 p.s.i.g. with a polymerization catalyst system consisting essentially of (1) from about 2.5 to about 100 millimoles per liter of reaction zone of a chromyl compound selected from the group consisting of a preformed complex of chromyl chloride and an alpha olefin having up to about 6 carbon atoms, and chromyl acetate and (2) an organoaluminum compound having up to about 18 carbon atoms selected from the group consisting of aluminum trialkyls, aluminum triaryls and aluminum alkyl sesquihalides, said chromyl compound and said organoaluminum compound being present in a molar ratio of from about 0.1 to 1.0 to about 2.0 to 1.0.

3. A process of polymerizing a monomer selected from the group consisting of vinyl chloride, acylonitrile, methyl methacrylate and ethylene which comprises contacting said monomer at a temperature between about 10 and 100° C. and a pressure between about 0 and 1000 p.s.i.g. with a polymerization catalyst system consisting essentially of (1) from about 2.5 to about 100 millimoles per liter of reaction zone of a preformed complex of chromyl chloride and an alpha olefin having up to about 6 carbon atoms and (2) an organoaluminum compound having up to about 18 carbon atoms selected from the group consisting of aluminum trialkyls, aluminum triaryls and aluminum alkyl sesquihalides, said complex and said organoaluminum compound being present in a molar ratio of from about 0.1 to 1.0 to about 2.0 to 1.0.

4. The process of claim 3, wherein said complex is a complex of chromyl chloride and hexene-1 of about 3:2.

5. A process of polymerizing methyl methacrylate which comprises contacting said methyl methacrylate at a temperature between about 10 and 100° C. and a pressure between about 0 and 1000 p.s.i.g. with a polymerization catalyst system consisting essentially of (1) from about 2.5 to about 100 millimoles per liter of reaction zone of a chromyl compound selected from the group consisting of a preformed complex of chromyl chloride with an alpha olefin having up to about 6 carbon atoms, and chromyl acetate and (2) an organoaluminum compound having up to about 18 carbon atoms wherein an aluminum atom is directly bonded to at least one member selected from the class consisting of alkyl, aryl, and alkyl sesquihalide groups, said chromyl compound and said organoaluminum compound being present in a molar ratio of from about 0.1 to 1.0 to about 2.0 to 1.0.

6. A process of polymerizing vinyl chloride which comprises contacting said vinyl chloride at a temperature between about 10 and 100° C. and a pressure between about 0 and 1000 p.s.i.g. with a polymerization catalyst system consisting essentially of (1) from about 2.5 to about 100 millimoles per liter of reaction zone of a chromyl compound selected from the group consisting of a preformed complex of chromyl chloride with an alpha olefin having up to about 6 carbon atoms, and chromyl acetate and (2) an organoaluminum compound having up to about 18 carbon atoms wherein an aluminum atom is directly bonded to at least one member selected from the class consisting of alkyl, aryl, and alkyl sesquihalide groups, said chromyl compound and said organoaluminum compound being present in a molar ratio of from about 0.1 to 1.0 to about 2.0 to 1.0.

7. A process of polymerizing vinyl chloride which comprises contacting said vinyl chloride at a temperature between about 10 and 100° C. and a pressure between about 0 and 100 p.s.i.g. with a polymerization catalyst system consisting essentially of (1) from about 2.5 to 100 millimoles per liter of reaction zone of a preformed complex of chromyl chloride and an alpha olefin having up to about 6 carbon atoms and (2) aluminum triisobutyl, in a molar ratio of from about 0.1 to 1.0 to about 2.0 to 1.0.

8. The process of claim 7, wherein said chromyl chloride-alpha olefin complex is an addition complex of chromyl chloride and hexene-1.

9. A process of polymerizing acrylonitrile which comprises contacting said acrylonitrile at a temperature between about 10 and 100° C. and a pressure between about 0 and 1000 p.s.i.g. with a polymerization catalyst system consisting essentially of (1) from about 2.5 to about 100 millimoles per liter of reaction zone of a chromyl compound selected from the group consisting of a preformed complex of chromyl chloride with an alpha olefin having up to about 6 carbon atoms, and chromyl acetate and (2) an organoaluminum compound having up to about 18 carbon atoms wherein an aluminum atom is directly bonded to at least one member selected from the class consisting of alkyl, aryl, and alkyl sesquihalide groups, said chromyl compound and said organoaluminum compound being present in a molar ratio of from about 0.1 to 1.0 to about 2.0 to 1.0.

10. A process of polymerizing acrylonitrile which comprises contacting said acrylonitrile at a temperature between about 10 and 100° C. and a pressure between about 0 and 1000 p.s.i.g. with a polymerization catalyst system consisting essentially of (1) from about 2.5 to 100 millimoles per liter of reaction zone of a preformed complex of chromyl chloride and an alpha olefin having up to about 6 carbon atoms and (2) aluminum triisobutyl, in a molar ratio of from about 0.1 to 1.0 to about 2.0 to 1.0.

11. The process of claim 10, wherein said chromyl chloride-alpha olefin complex is an addition complex of chromyl chloride and hexene-1.

12. A process of polymerizing ethylene which comprises contacting said ethylene at a temperature between about 10 and 100° C. and a pressure between about 0 and 1000 p.s.i.g. with a polymerization catalyst system consisting essentially of (1) from about 2.5 to about 100 millimoles per liter of reaction zone of a preformed complex of chromyl chloride with an alpha olefin having up to about 6 carbon atoms, and chromyl acetate and (2) an organoaluminum compound having up to about 18 carbon atoms selected from the group consisting of aluminum trialkyls, aluminum triaryls and aluminum alkyl sesquihalides, said chromyl compound and said organoaluminum compound being present in a molar ratio of from about 0.1 to 1.0 to about 2.0 to 1.0.

13. A process of polymerizing ethylene which comprises contacting said ethylene at a temperature between about 10 and 100° C. and a pressure between about 0 and 1000 p.s.i.g. with a polymerization catalyst system consisting essentially of (1) from about 2.5 to 100 millimoles per liter of reaction zone of a preformed addition complex of chromyl chloride and hexene-1 and (2) aluminum triethyl, in a molar ratio of from about 0.1 to 1.0 to about 2.0 to 1.0.

14. A process of polymerizing ethylene which comprises contacting said ethylene at a temperature between about 10 and 100° C. and a pressure between about 0 and 1000 p.s.i.g. with a polymerization catalyst system consisting essentially of (1) from about 2.5 to 100 millimoles per liter of reaction zone of chromyl acetate and (2) aluminum triethyl, in a molar ratio of from about 0.1 to 1.0 to about 2.0 to 1.0.

15. A polymerization catalyst system for the polymerization of ethylenically unsaturated compounds consisting essentially of (1) a chromyl compound selected from the group consisting of a preformed complex of chromyl chloride and an alpha olefin having up to about 6 carbon atoms and chromyl acetate and (2) an organometallic compound having up to about 18 carbon atoms, wherein a metal of Group IIIb of the Periodic Table (Mendeleev) is directly bonded to at least one member selected from the class consisting of alkyl, aryl and alkyl sesquihalide groups, in a molar ratio of from about 0.1 to 1.0 to about 2.0 to 1.0.

16. A polymerization catalyst system for the polymerization of ethylenically unsaturated compounds consisting essentially of (1) a chromyl compound selected from the group consisting of a preformed complex of chromyl chloride and an alpha olefin having up to about 6 carbon atoms and chromyl acetate and (2) an organo-aluminum compound having up to about 18 carbon atoms, selected from the group consisting of aluminum trialkyls, aluminum triaryls and aluminum alkyl sesquihalides, in a molar ratio of from about 0.1 to 1.0 to about 2.0 to 1.0.

17. A polymerization catalyst system for the polymerization of ethylenically unsaturated compounds consisting essentially of (1) a chromyl compound selected from the group consisting of a preformed complex of chromyl chloride and an alpha olefin having up to about 6 carbon atoms and chromyl acetate and (2) an aluminum trialkyl having up to about 12 carbon atoms, in a molar ratio of from about 0.1 to 1.0 to about 2.0 to 1.0.

18. A polymerization catalyst system for the polymerization of ethylenically unsaturated compounds consisting essentially of (1) a preformed addition complex of chromyl chloride and hexene-1, and (2) an aluminum trialkyl having up to about 12 carbon atoms, in a molar ratio of from about 0.1 to 1.0 to about 2.0 to 1.0.

19. A polymerization catalyst system for the polymerization of ethylenically unsaturated compounds consisting essentially of (1) a preformed addition complex of chromyl chloride and hexene-1, and (2) aluminum triethyl, in a molar ratio of from about 0.1 to 1.0 to about 2.0 to 1.0.

20. A polymerization catalyst system for the polymerization of ethylenically unsaturated compounds consisting essentially of chromyl acetate and aluminum triethyl, in a molar ratio of from about 0.1 to 1.0 to about 2.0 to 1.0.

References Cited by the Examiner

UNITED STATES PATENTS

| | | | |
|---|---|---|---|
| 2,446,897 | 8/1948 | Young et al. | 260—93.5 |
| 2,827,445 | 3/1958 | Bartolomeo et al. | 260—94.9 |
| 2,827,447 | 3/1958 | Nowlin et al. | 260—94.9 |
| 2,846,427 | 8/1958 | Findlay | 260—94.9 |
| 2,881,156 | 4/1959 | Pilar et al. | 260—94.9 |
| 2,882,264 | 4/1959 | Barnes et al. | 260—94.9 |
| 2,886,561 | 5/1959 | Reynolds et al. | 260—93.7 |
| 2,920,062 | 1/1960 | McFarland | 260—93.7 |
| 2,936,302 | 5/1960 | Jones et al. | 252—431 |
| 3,103,527 | 9/1963 | Pauson et al. | 260—438 |
| 3,111,532 | 11/1963 | Wyman | 260—438 |

FOREIGN PATENTS

| | | |
|---|---|---|
| 545,968 | 9/1956 | Belgium. |
| 566,713 | 4/1958 | Belgium. |

OTHER REFERENCES

Calloway: Chemical Reviews, vol. 17, page 375 (1935).

Robinson et al.: J. of Applied Physics, vol. 15 (1944), pp. 343–350.

Eirich et al.: J. of Colloid Science, pp. 748–766 (1956), pp. 763–4 relied on.

Fox et al.: J. of Amer. Chem. Soc. 80, 1768–9 (1958).

Gaylord et al.: Linear & Stereoregular Addition Polymers, Interscience, Inc., N.Y. (1959), p. 31.

JOSEPH L. SCHOFER, *Primary Examiner.*

DANIEL ARNOLD, HAROLD N. BURSTEIN, PHILIP E. MANGAN, LOUISE P. QUAST, JOSEPH R. LIBERMAN, LEON J. BERCOVITZ, *Examiners.*